(12) United States Patent
Koshigaya

(10) Patent No.: US 11,073,881 B2
(45) Date of Patent: Jul. 27, 2021

(54) ELECTRONIC APPARATUS AND CONTROL METHOD OF ELECTRONIC APPARATUS

(71) Applicant: CANON KABUSHIKI KAISHA, Tokyo (JP)

(72) Inventor: Motoki Koshigaya, Yashio (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 190 days.

(21) Appl. No.: 16/232,269

(22) Filed: Dec. 26, 2018

(65) Prior Publication Data

US 2019/0227609 A1 Jul. 25, 2019

(30) Foreign Application Priority Data

Jan. 24, 2018 (JP) .............................. JP2018-009581

(51) Int. Cl.
*G06F 1/26* (2006.01)
*G06F 13/42* (2006.01)
*G06F 1/28* (2006.01)

(52) U.S. Cl.
CPC ............... *G06F 1/266* (2013.01); *G06F 1/28* (2013.01); *G06F 13/4282* (2013.01); *G06F 2213/0042* (2013.01)

(58) Field of Classification Search
CPC ........ G06F 1/28; G06F 1/266; G06F 13/4282; G06F 2213/0042
See application file for complete search history.

(56) References Cited

U.S. PATENT DOCUMENTS

| 6,845,422 | B2 * | 1/2005 | Shimada | ................... G06F 1/18 |
| | | | | 710/305 |
| 9,170,622 | B2 | 10/2015 | Nakagai | |
| 2006/0117195 | A1 * | 6/2006 | Niwa | ....................... G06F 1/266 |
| | | | | 713/300 |
| 2009/0179490 | A1 * | 7/2009 | Nagao | ..................... G06F 1/266 |
| | | | | 307/31 |

(Continued)

FOREIGN PATENT DOCUMENTS

JP 2013-50944 3/2013

*Primary Examiner* — Nimesh G Patel
(74) *Attorney, Agent, or Firm* — Venable LLP

(57) ABSTRACT

To make is possible to use a peripheral device that consumes a current exceeding the rated current allocated to each port in a simpler system configuration in an electronic apparatus having a plurality of external interfaces. The electronic apparatus includes: a power source unit configured to supply a current to the external interfaces included in the electronic apparatus; a first power source control unit configured to guarantee a total current supplied for the two or more external interfaces and to perform current supply control for a specific external interface; and a second power source control unit configured to perform current supply control for the other external interfaces other than the specific external interface of the plurality of external interfaces by taking a current output from the first power source control unit as an input, and by the second power source control unit suspending current supply for the other external interfaces, the first power source control unit increases a current that can be supplied for the specific external interface.

12 Claims, 11 Drawing Sheets

(56) References Cited

U.S. PATENT DOCUMENTS

2011/0018344 A1* 1/2011 Liao .................. G06F 1/266
                                                        307/31
2014/0129856 A1* 5/2014 Bertin ................ G06F 1/325
                                                        713/320

* cited by examiner

| | Status before error notification | | | Source of error transmission | Determination result |
|---|---|---|---|---|---|
| | Port 1 | Port 2 | Port 3 | | |
| Condition 1 | not in use | not in use | not in use | VBUS control unit of Port 1 | A |
| Condition 2 | not in use | not in use | not in use | VBUS control unit of Port 2 | B |
| Condition 3 | not in use | not in use | not in use | VBUS control unit of Port 3 | C |
| Condition 4 | in use | not in use | not in use | VBUS control unit of Port 1 | D |
| Condition 5 | in use | not in use | not in use | VBUS control unit of Port 2 | B |
| Condition 6 | in use | not in use | not in use | VBUS control unit of Port 3 | C |
| Condition 7 | not in use | in use | not in use | VBUS control unit of Port 1 | A |
| Condition 8 | not in use | in use | not in use | VBUS control unit of Port 2 | E |
| Condition 9 | not in use | in use | not in use | VBUS control unit of Port 3 | C |
| Condition 10 | not in use | not in use | in use | VBUS control unit of Port 1 | A |
| Condition 11 | not in use | not in use | in use | VBUS control unit of Port 2 | B |
| Condition 12 | not in use | not in use | in use | VBUS control unit of Port 3 | E |
| Condition 13 | in use | in use | not in use | VBUS control unit of Port 1 | D |
| Condition 14 | in use | in use | not in use | VBUS control unit of Port 2 | E |
| Condition 15 | in use | in use | not in use | VBUS control unit of Port 3 | C |
| Condition 16 | in use | not in use | in use | VBUS control unit of Port 1 | D |
| Condition 17 | in use | not in use | in use | VBUS control unit of Port 2 | B |
| Condition 18 | in use | not in use | in use | VBUS control unit of Port 3 | E |
| Condition 19 | in use | in use | in use | VBUS control unit of Port 1 | E |
| Condition 20 | in use | in use | in use | VBUS control unit of Port 2 | E |
| Condition 21 | in use | in use | in use | VBUS control unit of Port 3 | E |

| | Determination contents |
|---|---|
| A | Device of Port 1 consumes a nonstandard current, or is defective |
| B | Device of Port 2 consumes a nonstandard current, or is defective |
| C | Device of Port 3 consumes a nonstandard current, or is defective |
| D | Device of Port 1 consumes a nonstandard current |
| E | Abnormality beyond expectation |

FIG.7B

ELECTRONIC APPARATUS AND CONTROL METHOD OF ELECTRONIC APPARATUS

BACKGROUND OF THE INVENTION

Field of the Invention

The present invention relates to a control technique to supply power for a peripheral device in an electronic apparatus having a plurality of external interfaces.

Description of the Related Art

Conventionally, as an external interface that connects an electronic apparatus and a peripheral device, the interface of the USB (Universal Serial Bus) standard has prevailed widely. The USB standard specifies as part of the specifications thereof that it is possible to supply a current, as bus power, for a target peripheral device from an electronic apparatus (information processing apparatus), other than data communication. In a case where a current is supplied for a peripheral device via a USB connection port (USB port), in an electronic apparatus, a power source for supplying a sufficient current (rated current) by which a supposed peripheral device can operate stably is included. However, a variety of peripheral devices exist and a peripheral device whose consumption power is larger than or equal to supposed power consumption may exist, and therefore, there is a possibility that a current larger than or equal to the rated current at the USB port (overcurrent) flows. Consequently, in order to protect elements and the like from an overcurrent, normally, a circuit for suppressing an overcurrent (that is, an overcurrent control circuit) is included in an electronic apparatus.

Further, in general, a recent electronic apparatus includes a plurality of external interface ports, such as USB ports. In this case, for each port, the above-described overcurrent control circuit is provided. For example, in a case of USB 2.0, each overcurrent control circuit limits a current exceeding 500 mA, and therefore, it is not possible to use a peripheral device that requires 500 mA or more for its operation (for example, a portable HDD and the like). Regarding this point, for example, Japanese Patent Laid-Open No. 2013-50944 has proposed a technique that makes it possible to use a peripheral device that consumes a current exceeding the rated current at each USB port by giving a current secured by a dummy connector to a specific USB port.

With the technique of Japanese Patent Laid-Open No. 2013-50944 described above, it is necessary to add a new hardware configuration, such as a dummy connect, in order to secure a current that is given to a peripheral device that consumes a current exceeding the rated current at the USB port, and therefore, the cost of the entire system is raised. Consequently, an object of the present invention is to make it possible to supply a sufficient current for a peripheral device that consumes a current exceeding the rated current at each external interface port without the need to separately add a hardware configuration, such as a dummy connector.

SUMMARY OF THE INVENTION

The electronic apparatus according to the present invention is an electronic apparatus including a plurality of external interfaces for connecting an external device, and includes: a power source unit configured to supply a current to all the external interfaces included in the electronic apparatus; a first power source control unit configured to guarantee a total current supplied for the two or more external interfaces of the plurality of external interfaces and to perform current supply control for a specific external interface of the plurality of external interfaces; and a second power source control unit configured to perform current supply control for the other external interfaces other than the specific external interface of the plurality of external interfaces by taking a current output from the first power source control unit as an input, and by the second power source control unit suspending current supply for the other external interfaces, the first power source control unit increases a current that can be supplied for the specific external interface.

Further features of the present invention will become apparent from the following description of exemplary embodiments with reference to the attached drawings.

BRIEF DESCRIPTION OF THE DRAWINGS

FIG. 7A and FIG. 7B are each a diagram showing an example of a table used for determining the cause of a VBUS error;

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

Prior Art

Figure 1:
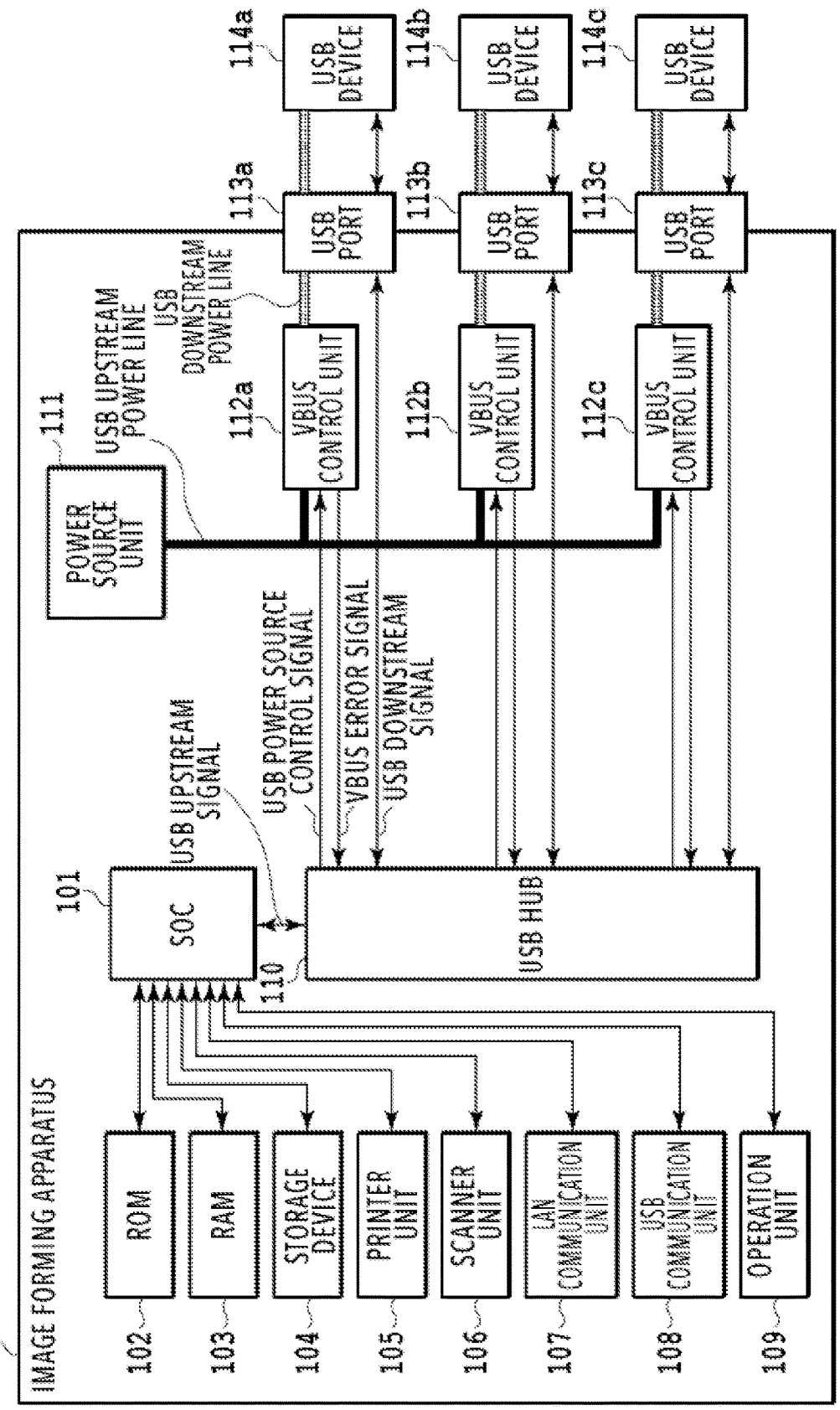
FIG. 1 is an explanatory diagram of prior art.

Before explanation of the embodiments of the present invention is given, the prior art is reviewed by taking an electronic apparatus including a plurality of USB standard external interfaces as an example. FIG. 1 is a block diagram showing an example of a hardware configuration of an image forming apparatus 10 including a plurality of USB ports according to the prior art. An SOC (System on a Chip) 101 is a controller that internally includes a CPU and controls the entire image forming apparatus 10. A ROM 102 is a memory storing a program for activating the SOC 101, various kinds of setting information and so on. A RAM 103 is a work memory for the SOC 101 to operate. The RAM 103 is used to save (store) image data for which image processing has been performed by execution of the operation, such as loading of various programs, storing of arithmetic operation processing results, printing, and scanning. A storage device 104 includes, for example, an HDD, an SSD and so on, and is a nonvolatile large-capacity storage medium for storing programs and various data whose data size is large. A printer unit 105 includes a photoconductor drum, a laser oscillator, a toner fixing unit, a motor and so on and performs printing processing on a printing sheet, such as paper. A scanner unit 106 includes a document detection sensor, a reading sensor, a motor and so on and optically reads a document set on a document table, not shown schematically. A LAN communication unit 107 includes a network controller and the like and performs network communication with an external device via a wired or a wireless LAN.

A USB communication unit 108 includes a USB device controller and a USB interface (for example, Type B) on the device side. The USB communication unit 108 is connected with a USB interface (for example, Type A) on the host side possessed by an external device, such as a PC, by a USB cable and performs communication of the USB standard with a PC and the like. The USB communication unit 108 performs communication with an external device by the USB standard, like USB ports 113a to 113c, to be described later. However, the USB communication unit 108 differs from the USB ports 113a to 113c in that the USB ports 113a to 113c play a role of the host side, but the USB communication unit 108 plays a role of the device side. An operation unit 109 is a user interface that receives image data for display from the SOC 101 and displays the image data on a screen and in addition thereto, receives a user operation via a touch panel, a key and so on, and transmits a control signal corresponding to the user operation to the SOC 101. The SOC 101 performs a predetermined function (for example, copy and the like) possessed by the image forming apparatus 10, changes various settings and so on, in accordance with the control signal based on the user operation input via the operation unit 109. A USB hub 110 is an external interface control unit connected with the SOC 101 by a serial bus of the USB standard and configured to extend the USB interface on the host side to a plurality of ports. In the example in FIG. 1, the USB hub 110 increases (extends) the one USB interface port possessed by the SOC 101 up to three ports. Hereinafter, a signal for communication of the USB standard between the SOC 101 and the USB hub 110 is called a "USB upstream signal". Further, a signal for communication of the USB standard between the SOC 101 and the USB ports 113a to 113c branched from the USB hub 110 is called a "USB downstream signal". The USB hub 110 detects a peripheral device (external device) that is connected, controls the communication speed, and performs transmission and reception of various signals with VBUS control units 112a to 112c, in addition to increasing ports by distributing signals. Hereinafter, a signal that is output from the USB hub 110 and which controls power supply for the VBUS control units 112a to 112c is called a "USB power source control signal". The VBUS control units 112a to 112c are each a power source control unit configured to control on or off of the power supplied for the USB ports 113a to 113c from a power source unit 111. The power source unit 111 converts input AC power into DC power and supplies necessary power for each unit within the image forming apparatus 10. The power source unit 111 is a supply source of current that is consumed at all the USB ports included in the image forming apparatus 10. Here, power lines to units other than the VBUS control units 112a to 112c are not shown schematically. In the configuration shown in FIG. 1, of the lines for power supply extending from the power source unit 111 toward the USB ports 113a to 113c, the power line on the input side of each of the VBUS control units 112a to 112c is called a "USB upstream power line". Further, the power line on the output side of each of the VBUS control units 112a to 112c is called a "USB downstream power line". Each of the VBUS control units 112a to 112c controls current supply for the USB ports 113a to 113c based on the USB power source control signal transmitted from the USB hub 110. For example, upon detecting that the USB power source control signal has changed from a disable signal to an enable signal, the VBUS control unit 112 performs control so as to turn on the internal connection and supplies a predetermined current for the USB port 113 through the USB downstream power line. The USB ports 113a to 113c are each a USB connector on the host side for connecting a peripheral device having a USB interface (hereinafter, called a "USB device") to the image forming apparatus 10. As USB devices 114a to 114c, there are USB memories, USB keyboards, mobile terminals, USB card readers, portable HDDs and so on. It is supposed that those USB devices operate on the designed rated current at the USB port included in the image forming apparatus 10, but as long as a connection port in a predetermined shape is possessed, any USB device can be connected to the USB ports 113a to 113c. Because of this, there is a case where a USB device that consumes a current exceeding the rated current at the USB port is connected. In a case where such a USB device beyond expectation is connected, a so-called overcurrent state where a current larger than or equal to a permitted value flows is brought about. Because of this, the VBUS control units 112a to 112c also have a function to detect and report an overcurrent, not only to control supply/shutoff of power. A signal that is output from each of the VBUS control units 112a to 112c toward the USB hub 110 (and toward the SOC 101 located ahead of the USB hub 110) and which reports the occurrence of an overcurrent is called a "VBUS error signal". Upon receipt of the VBUS error signal, the USB hub 110 switches the USB power source control signal from the enable signal to the disable signal and shuts off power supply from the VBUS control units 112a to 112c to the USB ports 113a to 113c. In general, a threshold value at the time of detection of an overcurrent is designed so as to satisfy the rated current at the USB port and in the case of the present embodiment, the threshold value is, for example, a value of 500 mA.

First Embodiment

Figure 2:
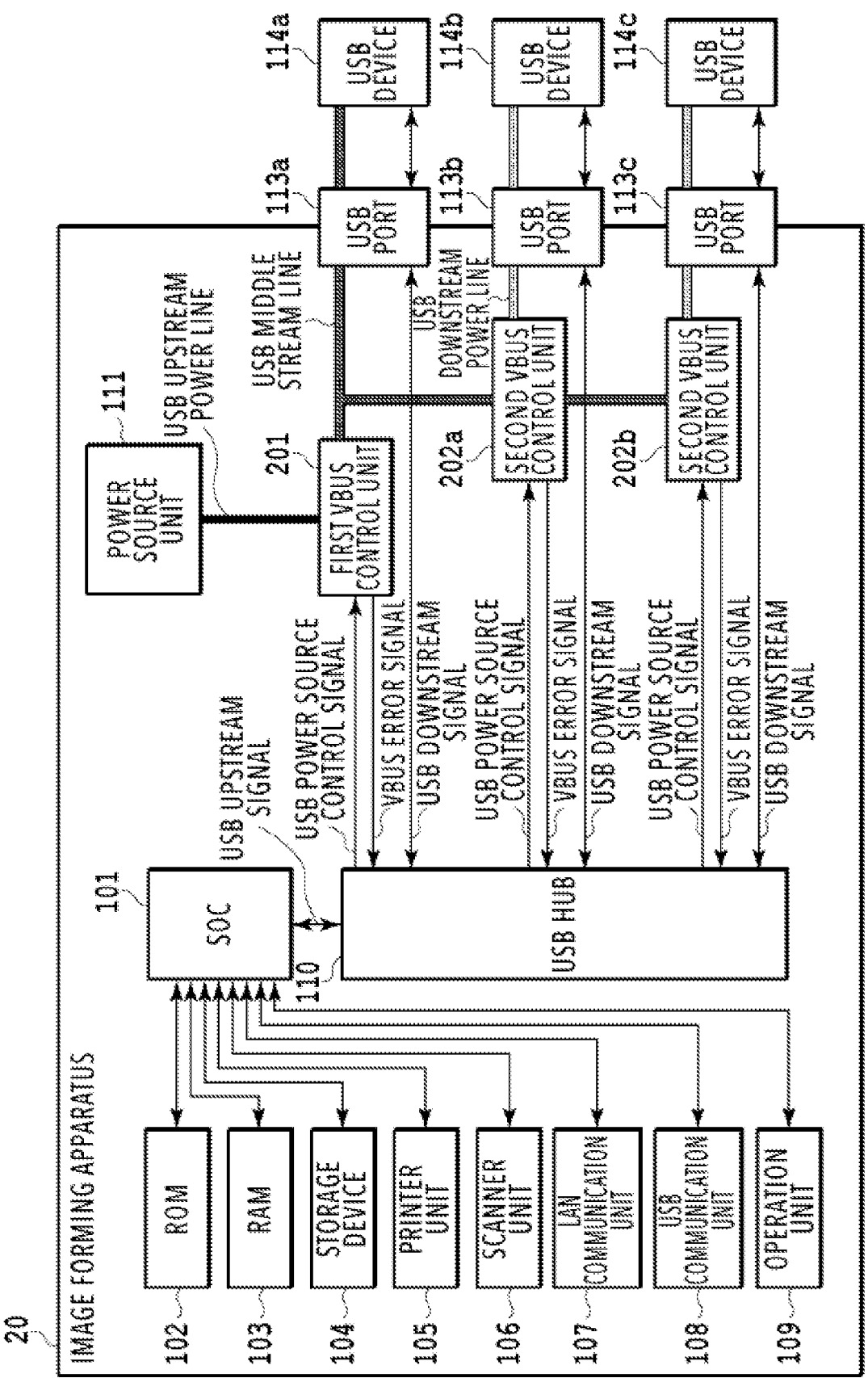
FIG. 2 is a block diagram showing an example of a hardware configuration of an image forming apparatus including a plurality of USB ports according to a first embodiment.

The embodiment of the present invention is explained in comparison with the prior art described above. FIG. 2 is a block diagram showing an example of a hardware configuration of an image forming apparatus 20 including a plurality of USB ports according to the present embodiment. Like the image forming apparatus 10 according to the prior art shown in FIG. 1, the image forming apparatus 20 shown in FIG. 2 includes three USB ports and does not differ greatly from the image forming apparatus 10 in the basic components. A difference between both the image forming apparatuses lies in the connection form between the VBUS control units 112a to 112c corresponding to the USB ports 113a to 113c, respectively, and the power source unit 111. In the image forming apparatus 10 according to the prior art, the power source unit 111 and the three VBUS control units 112a to 112c corresponding to the USB ports 113a to 113c, respectively, are connected in parallel. In contrast to this, in the image forming apparatus 20 according to the present embodiment, what is connected directly with the power source unit 111 is only one VBUS control unit (first VBUS control unit 201). Remaining two VBUS control units (second VBUS control units 202a and 202b) are connected in parallel with the first VBUS control unit 201 by taking the output of the first VBUS control unit 201 as an input. In the following, explanation of the portions in common to the contents of the prior art shown in FIG. 1 is omitted and the configuration of the present embodiment is explained by focusing attention on the difference in the power supply control for the USB ports 113a to 113c by the two kinds of VBUS control unit, which is a feature of the present embodiment.

As described above, the configuration of the present embodiment differs from that of the prior art in FIG. 1 in the connection form between the power source unit 111 and the three VBUS control units. Consequently, in the present embodiment, each section of the power line from the power source unit 111 up to the USB ports 113a to 113c is called as follows.

Figure 3A:
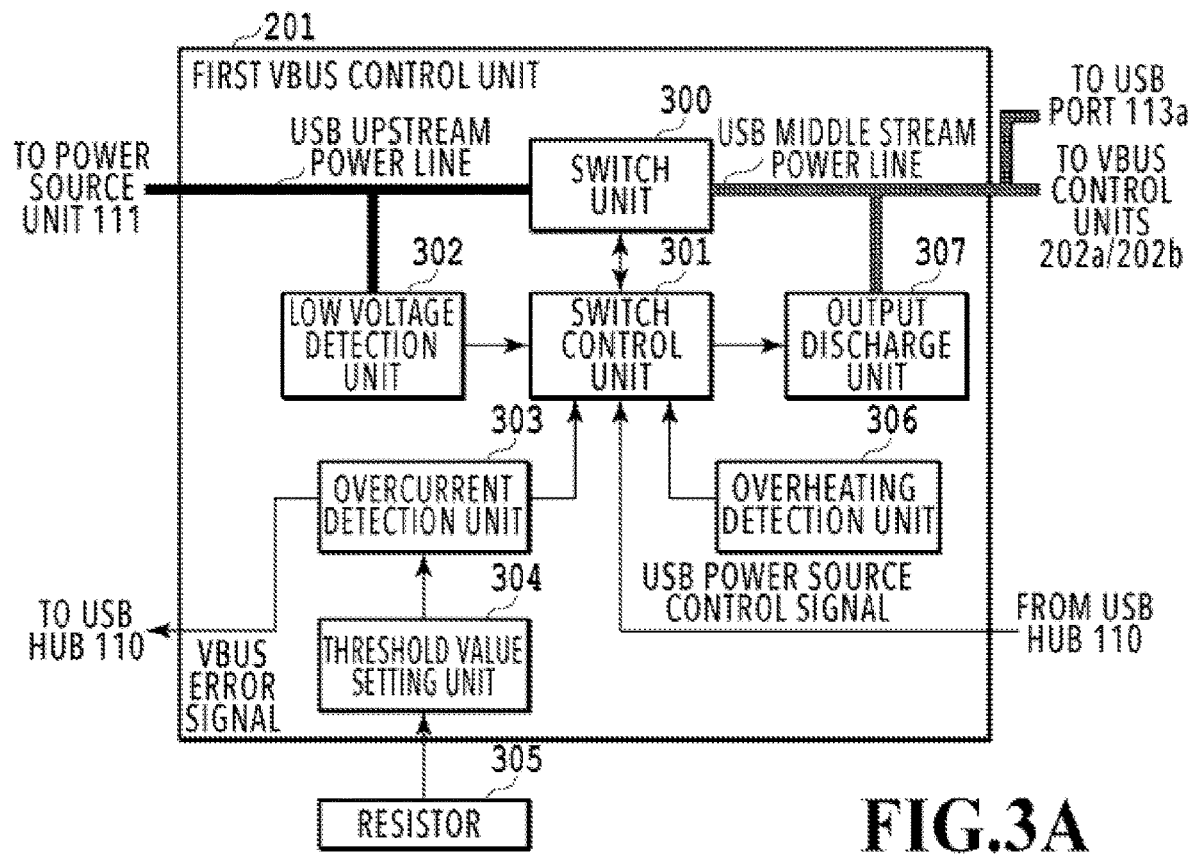
FIG. 3A is a diagram showing an internal configuration of a first VBUS control unit and FIG. 3B is a diagram showing an internal configuration of a second VBUS control unit.
Figure 3B:
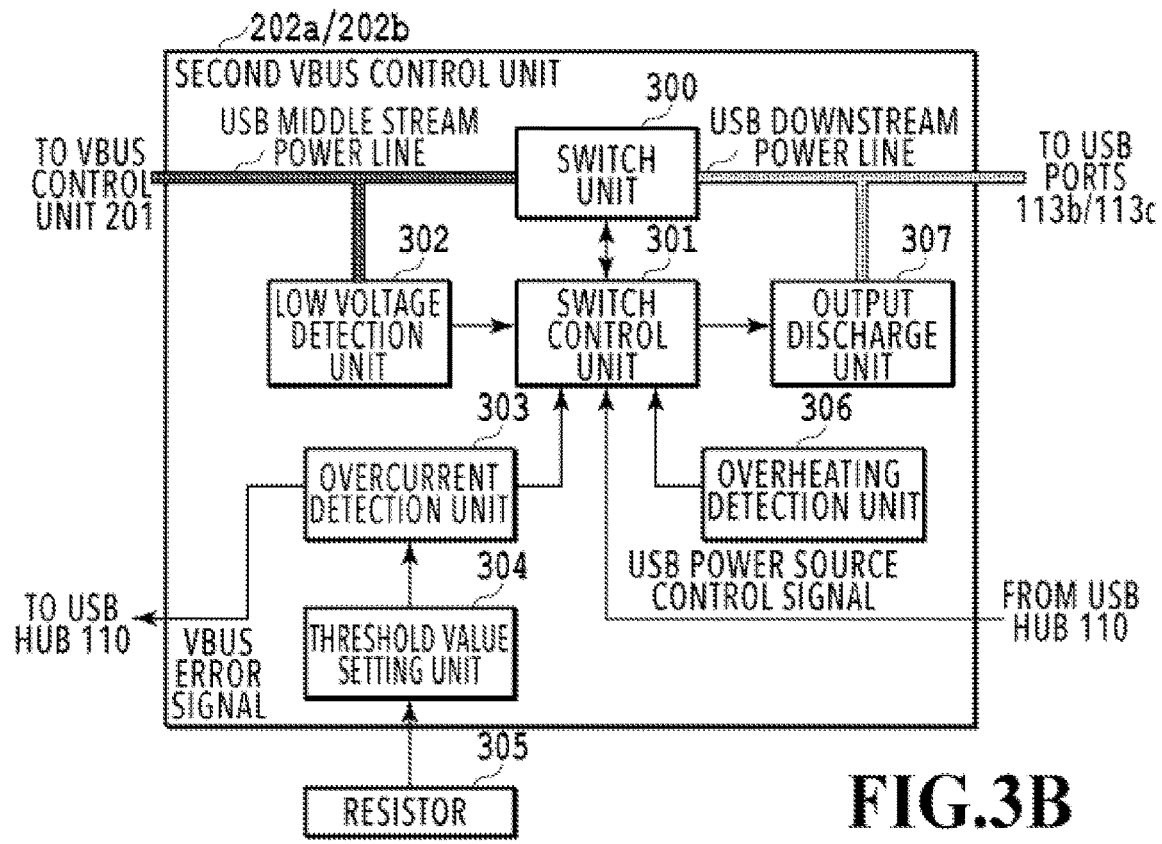

Power line on the input side of the first VBUS control unit 201: USB upstream power line
Power line on the output side (input sides of the second VBUS control units 202a and 202b) of the first VBUS control unit 201: USB middle stream power line
Power line on the output sides of the second VBUS control units 202a and 202b: USB downstream power line Here, the internal structure of the first and second VBUS control units of the present embodiment is explained in detail. FIG. 3A is a diagram showing the internal configuration of the first VBUS control unit 201 and FIG. 3B is a diagram showing the internal configuration of the second VBUS control units 202a and 202b, respectively. The first VBUS control unit 201 differs from the second VBUS control units 202a and 202b only in the threshold value that is set for overcurrent detection, and the function of each component is the same, and therefore, in the following, only the first VBUS control unit 201 is explained.

In general, a switch unit 30 includes a switching element, such as an FET, and controls the conduction between the USB upstream power line and the USB middle stream power line in accordance with a signal from a switch control unit 301. In general, the switch control unit 301 includes a charge pump circuit and a gate logic circuit and generates an operation control signal of the switch unit 300. The switch control unit 301 controls the conduction of the switch unit 300 in accordance with various notification signals from a low voltage detection unit 302, an overcurrent detection unit 303, and an overheating detection unit 306, to be described later, and the USB power source control signal from the USB hub 110. Further, the switch control unit 301 performs discharge control of the USB middle stream power line by notifying an output discharge unit 307 of that at the time of performing control so as to bring the switch unit 300 into a nonconduction state. The low voltage detection unit 302 monitors whether the voltage applied to the USB upstream power line is lower than or equal to a predetermined voltage value and in a case where the voltage is lower than or equal to the predetermined voltage value, the low voltage detection unit 302 notifies the switch control unit 301 of that. Upon receipt of the notification to the effect that the voltage is lower than or equal to the predetermined voltage value from the low voltage detection unit 302, the switch control unit 301 performs control so as to bring the switch unit 300 into the nonconduction state. Due to this, the occurrence of a malfunction is prevented. In a case where a current that flows through the USB upstream power line and the USB middle stream power line becomes larger than or equal to a predetermined current value, the overcurrent detection unit 303 notifies the switch control unit 301 and the USB hub 110 of that. In general, the input side (here, the USB upstream power line) and the output side (here, the USB middle stream power line) are connected via a resistor and the current value is detected by monitoring the voltages before and after the resistor. Upon receipt of the notification to the effect that an overcurrent is detected from the overcurrent detection unit 303, the switch control unit 301 limits the current that flows through the USB middle stream power line by bringing the switch unit 300 into a semi-conduction state. Further, the overcurrent detection unit 303 outputs a VBUS error notification signal to the USB hub 110 via a circuit (not shown schematically) including an open drain FET and the like. A threshold value setting unit 304 sets a threshold value of a current value detected by the overcurrent detection unit 303. The threshold value set here is determined by a resistance value of a resistor 305 for detecting an overcurrent, which is connected to the first VBUS control unit 201, and is a constant in accordance with the detection-target current value. That is, as the resistor 305 of the present embodiment, a fixed resistor is used and the threshold value that is set in the threshold value setting unit 304 is fixed. However, even though the threshold value desired to be set is the same, the resistance value of the resistor 305 may vary depending on the circuit structure and the like of the threshold value setting unit 304. It is also possible to dynamically change the threshold value by connecting a variable resistor or an external adjusting circuit, but in this case, it is necessary to add a circuit and control. Further, it becomes also necessary to cause the power source unit 111 to have a margin in accordance with the variable width. Because of this, in the present embodiment, the configuration is such that a fixed resistor that does not require a circuit to be added is adopted. The overheating detection unit 306 monitors whether the temperature of the first VBUS control unit 201 is higher than or equal to a predetermined value due to an overcurrent limit state continuing and the like, and notifies the switch control unit 301 of that in a case where the temperature becomes higher than or equal to the predetermined temperature. Upon receipt of the notification to the effect that the state is an overheating state from the overheating detection unit 306, the switch control unit 301 performs control so as to bring the switch unit 300 into the nonconduction state. In general, an output discharge unit 308 includes a switching element, such as an FET, and causes the USB middle stream power line to discharge under the control from the switch control unit 301.

As described previously, in the configuration of the prior art shown in FIG. 1, for the power source unit 111, the three VBUS control units 112a to 112c are connected in parallel. In this case, it is assumed that the overcurrent detection circuit within each VBUS control unit is set so as to detect a current exceeding 500 mA as an overcurrent. At this time, the maximum current value that may be used by the entire USB interface is 500 mA×3 (number of ports), that is, 1,500 mA. The supply capacity (total current amount that can be supplied) of the power source unit 111 is designed in view of the maximum current value such as this in each unit, which is the destination of supply. In fact, the power source unit 111 is designed so as to have some margin by taking into consideration variations, an inrush current and so on, but for convenience of explanation, here, it is assumed that the power source unit 111 is designed so as to be capable of supplying 1,500 mA at the maximum for USB interface. Then, in the configuration of the present embodiment shown in FIG. 2 also, it is similarly assumed that the power source unit 111 has the supply capacity of the rated current (=500 mA) at each port×3 (number of ports) (=1,500 mA). In this case, in the threshold value setting unit 304 inside the first VBUS control unit 201, which is the only VBUS control unit connected directly with the power source unit 111, a threshold value that guarantees a total current value corresponding to the three ports is set so as to enable the two or more (here, three) of the USB ports 113a to 113c to operate stably. That is, a threshold value for detecting a current exceeding 1,500 mA as an overcurrent is set. Then, in the threshold value setting unit 304 inside the second VBUS control units 202a and 202b that take the current output from the first VBUS control unit 201 as an input, as in the case with the prior art, a threshold value for detecting a current exceeding 500 mA as an overcurrent is set. As described above, in the configuration of the present embodiment, there is a difference in the threshold value setting for detecting an overcurrent between the first VBUS control unit 201 and the second VBUS control units 202a and 202b. However, as in the case with the configuration of the prior art, it is possible to set a current that can be used at each of the three USB ports 113a to 113c to 500 mA.

First, to the USB port 113b, a current up to 500 mA is guaranteed by the second VBUS control unit 202a, and to the USB port 113c, a current up to 500 mA is guaranteed by the second VBUS control unit 202b, respectively. Then, in the first VBUS control unit 201 whose permitted value is set to 1,500 mA, it is possible to supply 1,500 mA−500 mA×2=500 mA, and therefore, to the USB port 113a also, a current up to 500 mA is guaranteed. In the configuration of the present embodiment, for example, in a case where an overcurrent exceeding 500 mA flows through the USB device 114b connected to the USB port 113b, the second VBUS control unit 202a prevents a malfunction of and damage to the power source unit 111 by shutting off the current supply for the USB port 113b. Further, it is assumed that an overcurrent exceeding 500 mA flows through the USB device 114a connected to the USB port 113a in a case where a current of about 500 mA, which is the rated current, flows through the USB devices 114b and 114c connected to the USB ports 113b and 113c, respectively. In this case, the first VBUS control unit 201 prevents a malfunction of and damage to the power source unit 111 by shutting off the current supply for the USB port 113a. There may be a variety of use cases other than those described above, but with the configuration of the present embodiment, even though a defective or nonstandard USB device is connected to one of the USB ports and an overcurrent occurs, as in the case with the configuration according to the prior art shown in FIG. 1, it is made possible to protect the power source unit 111.

Figure 4:
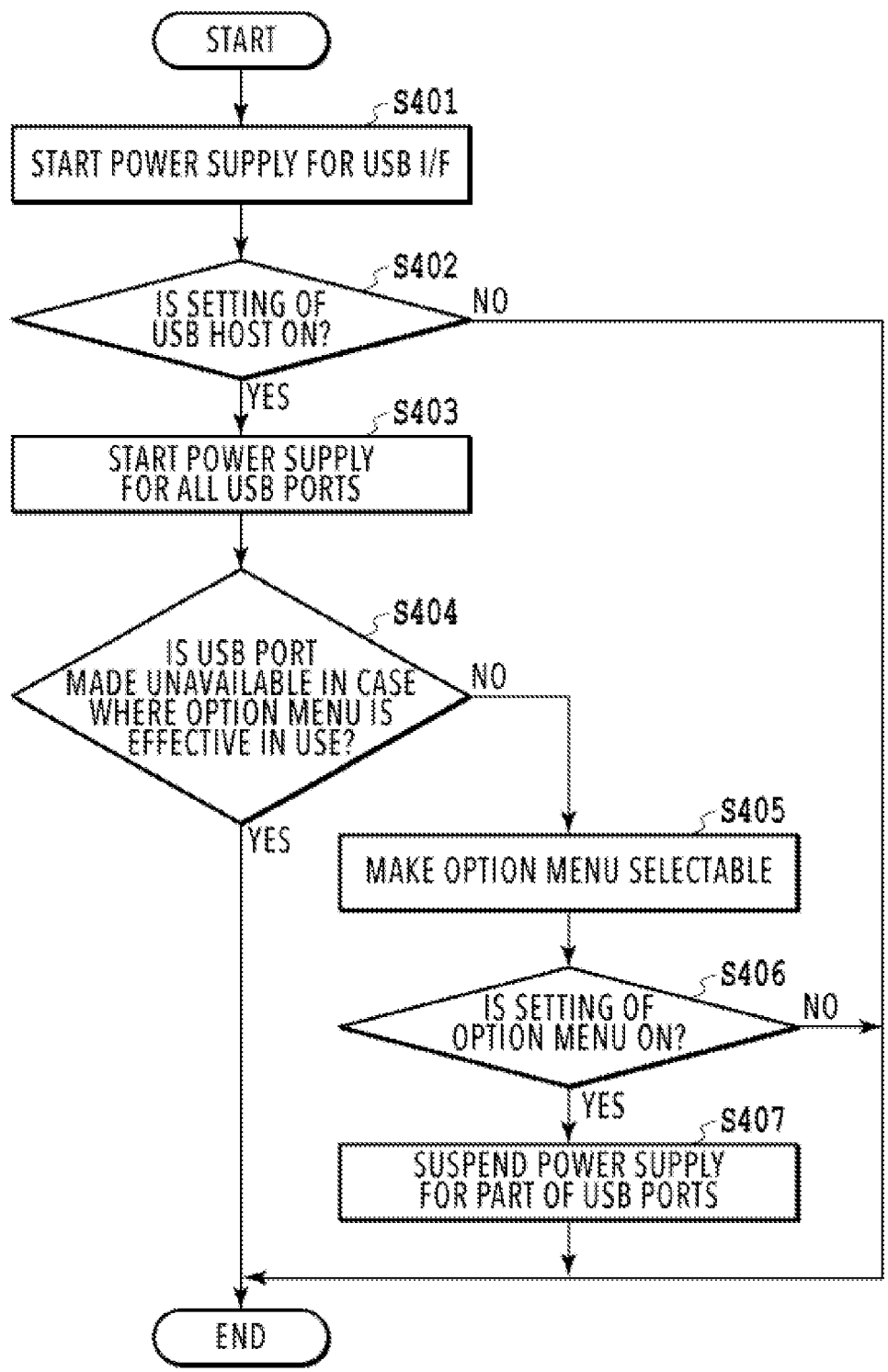
FIG. 4 is a flowchart showing control for making it possible to use a peripheral device that requires a current exceeding the rated current at a specific USB port.

Next, control for making it possible to use a peripheral device (for example, a portable HDD and the like) that requires a current larger than or equal to the rated current (here, 500 mA) for the operation thereof at a specific USB port in the configuration of the present embodiment is explained by using a flowchart in FIG. 4. The series of processing shown in the flowchart in FIG. 4 is implemented by the main power source of the image forming apparatus 20 being turned on and a predetermined program loaded onto the RAM 103 being executed by the SOC 101. In the following, explanation is given by taking control as an example, which increases the value of a current that can be used at the USB port 113a that directly receives the current supply from the first VBUS control unit 201 by making ineffective the USB port 113c that receives the current supply from the second VBUS control unit 202b so that it is no longer possible to use the USB port 113c.

Figure 5A:
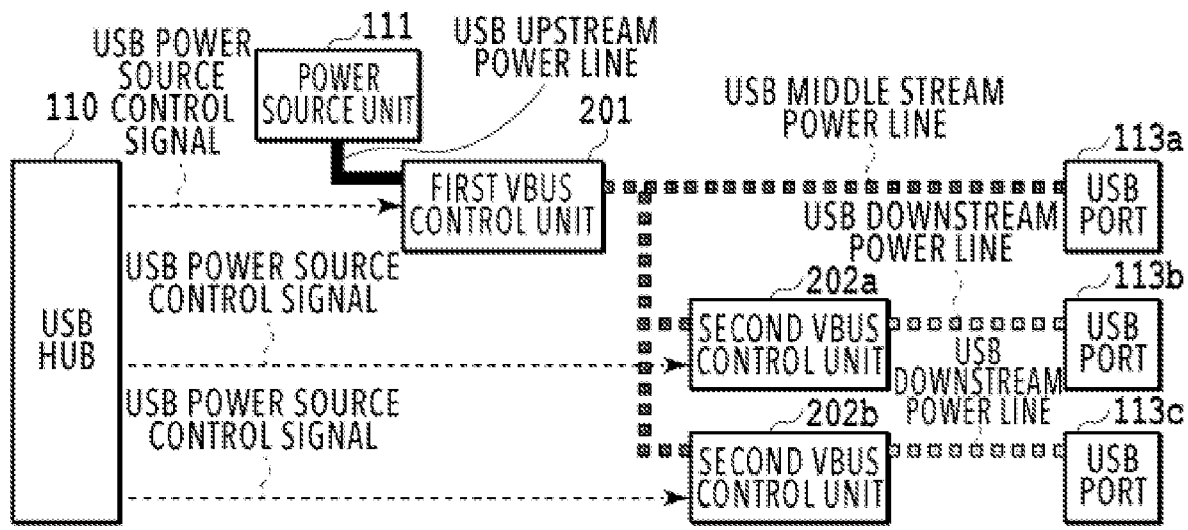
FIG. 5A to FIG. 5C are each a diagram showing an energized state of each power line toward each USB port according to the first embodiment.
Figure 6A:
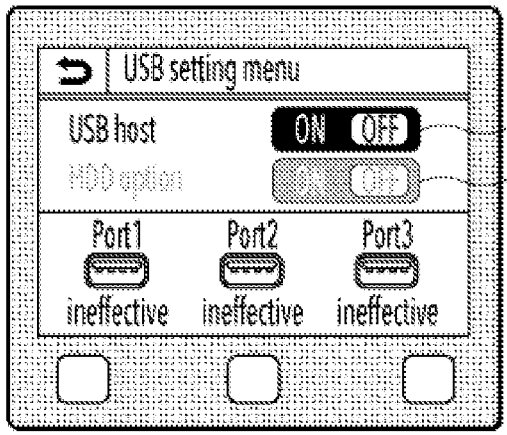
FIG. 6A to FIG. 6E are each a diagram showing an example of a UI screen for USB setting according to the first embodiment.

In response to the main power source turning on in the image forming apparatus 20, at step 401, the power supply for USB interface is started from the power source unit 111 through predetermined initialization processing. The power that the power source unit 111 supplies is, for example, DC power of 5 V. FIG. 5A shows an energized state of each power line toward the USB ports 113a to 113c at this time. The USB power source control signal from the USB hub 110 toward each VBUS control unit is indicated by a broken line and this means that the signal is the disable signal. Then, of each power line, the power line indicated by a solid line indicates the on state and the power line indicated by the broken line indicates the off state. That is, in the state in FIG. 5A, only the USB upstream power line is energized and the USB middle stream power line and the USB downstream power line are in the non-energized state. An example of a UI screen for USB setting, which is displayed on the operation unit 109 at this time, is shown in FIG. 6A. On the UI screen in FIG. 6A, a setting button 601 of a "USB host" menu that specifies use/not use of the USB port is set to "OFF". Due to this, from the USB hub 110, the USB power source control signal, which is the disable signal, is output to each VBUS control unit. Here, it is assumed that the initial value of the setting button 601 is OFF, but the initial value may be ON. In the case of the present embodiment, at the point in time immediately after the initialization processing, power is prevented from being supplied to each of the USB ports 113a to 113c, and therefore, the other menu on the UI screen at this point in time is displayed, for example, in gray-out so that a user cannot make a selection. That is, an option menu that makes it possible to use a peripheral device that consumes a current exceeding the rated current (hereinafter, called a "specific peripheral device") by changing the current amount that can be used at a specific USB port of all the USB ports, and a setting button 602 thereof are also displayed in gray-out. In the UI screen example of the present embodiment, the option menu is described as an "HDD option", but it is needless to say that the specific peripheral device is not limited to an HDD.

Figure 6B:
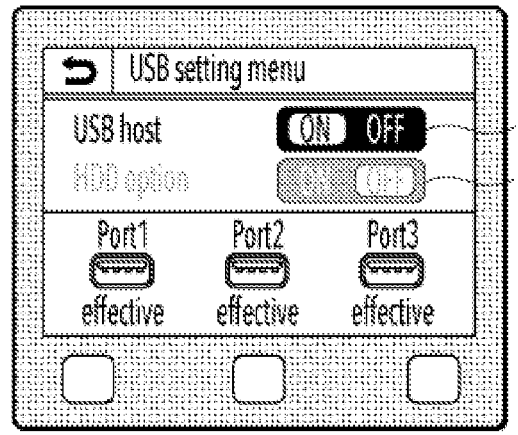

At step 402, whether a setting that makes it possible to use the USB ports 113a to 113c is set by a user is determined. Specifically, whether the setting button 601 of the "USB host" menu is set to ON by a user operation on the UI screen in FIG. 6A is determined. In a case where the setting button 601 remains at OFF, this processing is terminated because the subsequent steps are not necessary. On the other hand, in a case where the setting button 601 is set to ON by a user operation (see FIG. 6B), the processing advances to step 403.

Figure 5B:
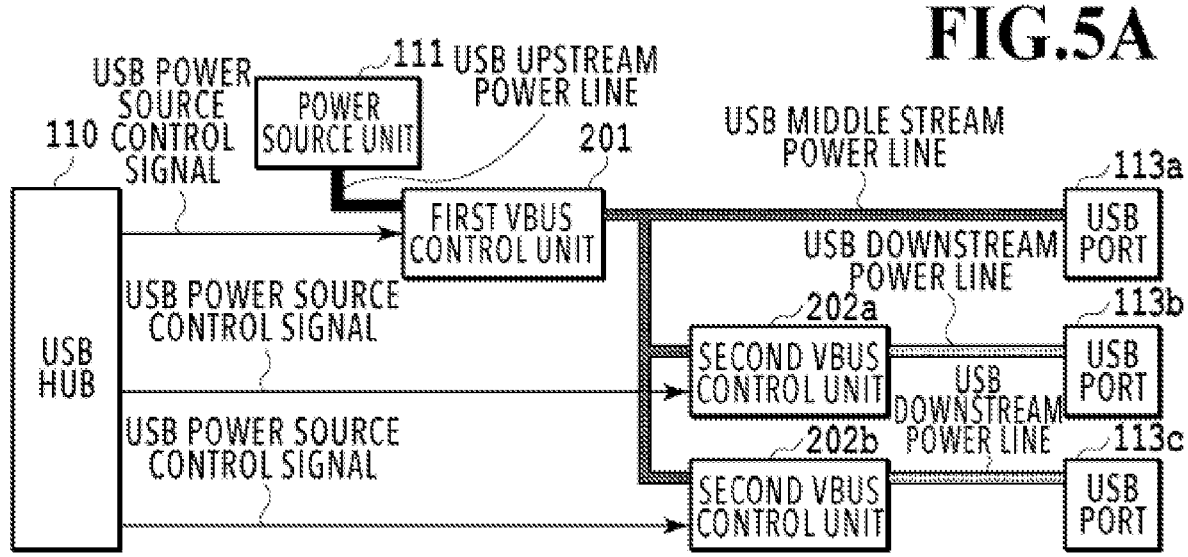

At step 403, the power supply is started for all the USB ports 113a to 113c. Specifically, in accordance with the instructions from the SOC 101, the USB hub 110 changes the USB power source control signal that is output to each VBUS control unit to the enable signal. FIG. 5B shows the energized state of each power line toward the USB ports 113a to 113c after the change. In FIG. 5B, the USB power source control signal from the USB hub 110 toward each VBUS control unit is indicated by the solid line indicating the enable signal. Then, the USB middle stream power line and the USB downstream power line indicated by the broken line indicating the non-energized state in FIG. 5A are indicated by the solid line indicating the energized state.

Figure 6C:
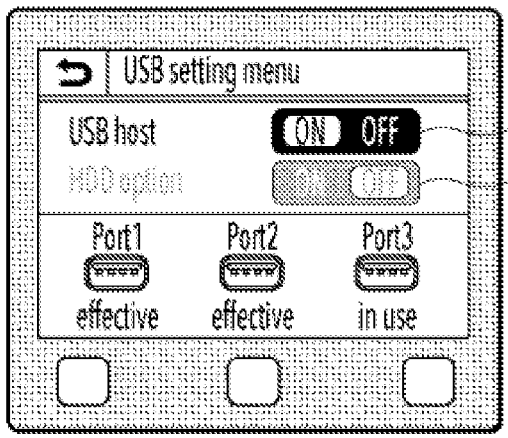

At step 404, whether a predetermined USB port (here, USB port 113c) that is made ineffective in a case where the option menu that makes it possible to use a specific peripheral device is set effective is currently in use is determined. In the case of the present embodiment, on a condition that the USB device 114c is inserted into the USB port 113c and the connection with the SOC 101 is established via the USB hub 110, it is determined that the USB port 113c is currently in use. FIG. 6C shows a display example of the UI screen in a case where the USB port 113c is in use. Here, "Port 3" corresponding to the USB port 113c is "in use". Consequently, in this case, it is determined that the USB port that is made ineffective in a case where the option menu is effective is currently in use. At this time, the character string of "HDD option" and the setting button 602 thereof remain displayed in gray-out indicating that it is not possible to make a selection. In a case where the results of the determination indicate that the USB port that is made ineffective on a condition that the option menu is effective is in use, this processing is exited because it is not possible to use the USB port. On the other hand, in a case where the USB port is not in use, the processing advances to step 405.

Figure 6D:
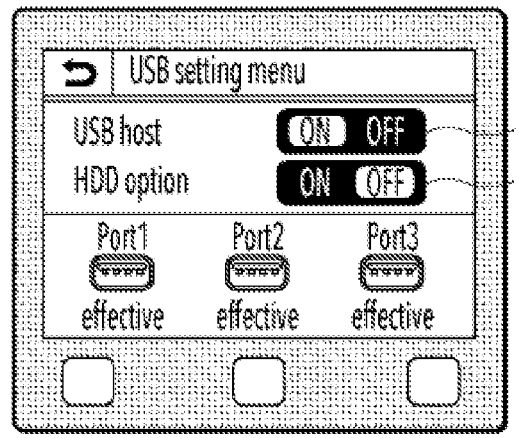

At step 405, the display of the option menu that makes it possible to use a specific peripheral device on the UI screen for USB setting is changed so that a user can make a selection. Specifically, the display of the character string of the "HDD option menu and the setting button 602 thereof is changed from the grayed-out state shown in FIG. 6C described above to the normal display state shown in FIG. 6D. Due to this, it is made possible for a user to select "HDD option" as the option menu.

At step 406 that follows, whether the option menu is selected on the UI screen for USB setting is determined. For example, in a case where the setting button 602 is operated within a predetermined time on the UI screen shown in FIG. 6D described above and set to ON, the processing advances to step 407. On the other hand, in a case where the setting button 602 remains at OFF and unchanged, this processing is exited.

Figure 5C:
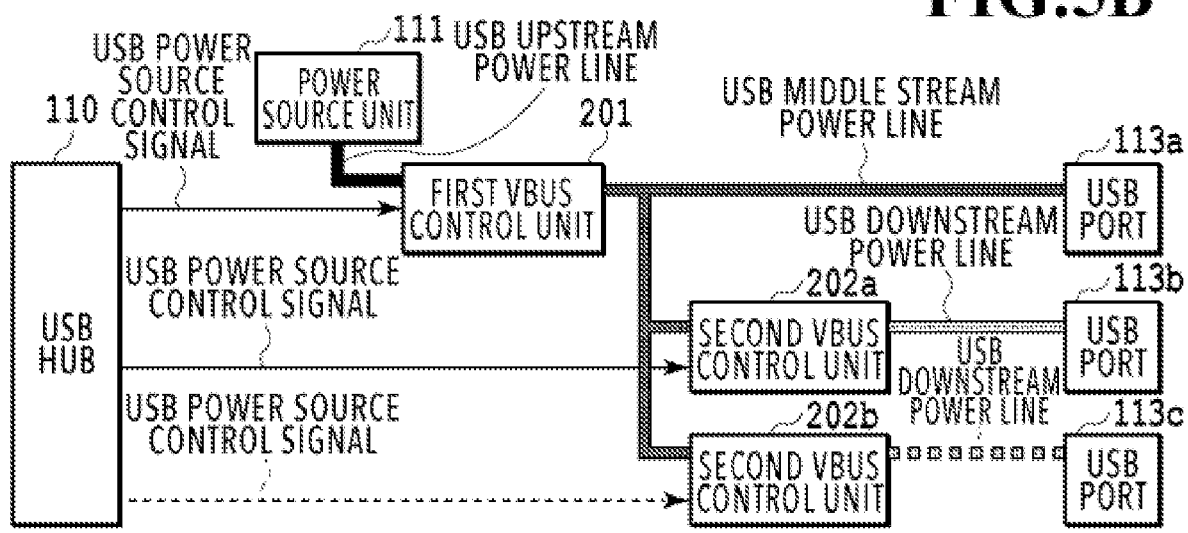
Figure 6E:
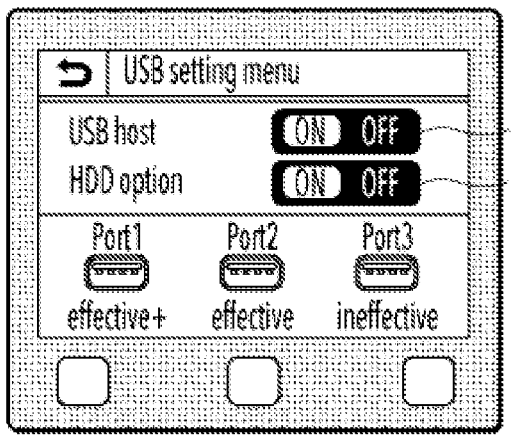

At step 407, in order to make it possible to use a specific peripheral device at a specific USB port, the power supply for at least part of the USB ports other than the specific USB port is suspended. In this case, the wording "at least part" is used because the number of USB ports for which the power supply is suspended is determined in accordance with a target value of current desired to be supplied for the above-described specific USB port. For example, in the configuration of the present embodiment also, it is possible to enable the use of a current up to 1,500 mA at the USB port 113a by suspending the power supply for both the USB ports 113b and 113c. As described previously, here, it is only required to be capable of enabling the use of a current up to 1,000 mA at the USB port 113a, and therefore, in order to secure a current amount of 500 mA, only the power supply for the USB port 113c is suspended while the power supply for the USB port 113b is maintained. Specifically, the USB power source control signal that is output from the USB hub 110 toward the second VBUS control unit 202b is changed to the disable signal. FIG. 5C shows the energized state of each power line toward the USB ports 113a to 113c after the change. The USB power source control signal from the USB hub 110 toward the second VBUS control unit 202b is indicated by the broken line indicating the disable signal. Then, the USB downstream power line between the second VBUS control unit 202b and the USB port 113c, which is indicated by the solid line indicating the energized state in FIG. 5B, is indicated by the broken line indicting the non-energized state. By suspending the power supply for the USB port 113c in this manner, it is possible to save 500 mA guaranteed by the second VBUS control unit 202b, and therefore, it is made possible to give the 500 mA to the USB port 113a. As described previously, the first VBUS control unit 201 guarantees 1,500 mA, which is the permitted value of current that the power source unit 111 can supply as power for USB, and the threshold value is set so as to detect a current exceeding this as an overcurrent. By 500 mA guaranteed by the second VBUS control unit 202b being saved, it is made possible to use a current up to 1,000 mA at the USB port 113a directly connected to the output of the first VBUS control unit 201. FIG. 6E shows a display example of the UI screen at this time. The state display of "Port 1" corresponding to the USB port 113a changes from "effective" to "effective +" and this indicates a state where it is possible to use a current larger than or equal to the original rated current at each port. Further, the state display of "Port 3" corresponding to the USB port 113c changes from "effective" to "ineffective" and this indicates that it is no longer possible to use the port. It may also be possible to display an upper limit value of the permitted current after the change, for example, such as "available up to 1,000 mA", in place of "ineffective +".

The above is the contents of the control for making it possible to use a peripheral device that requires a current exceeding the original rated current at a specific USB port. By making ineffective a USB port not in use, it is possible to enable the use of a specific peripheral device within the range of the current amount that the power source unit can supply without the need to add a circuit or the like that makes variable the threshold value for overcurrent detection.

The processing to return the state to the original state after changing the setting so as to make it possible to use a current exceeding the original rated current at a specific USB port only requires a user to set the setting button 602 of the option menu to OFF in the state where the specific USB port at which the permitted current value has been increased is not in use. Due to this, the USB power source control signal to the second VBUS control unit 202b is changed to the enable signal and the power supply for the USB port 113c having been made ineffective in order to secure a current amount is resumed. As a result of this, the energized state of the power to be supplied for each USB port returns to the state shown in FIG. 5B. Then, it is made possible again to use the USB port 113c and at the USB port 113a also, it is made possible to use only a USB device compatible with up to 500 mA, which is the original rated current.

Next, a method of determining the cause of a VBUS error signal that is output from the VBUS control unit in response to detection of an overcurrent based on the change in the state before and after the output of the VBUS error signal in a case of adopting the control configuration of power supply for the USB interface according to the present embodiment is explained. FIG. 7A and FIG. 7B are each an example of a table used for determination. In a case where information on the connection state of each of the USB ports 113a to 113c is held in advance and the SOC 101 receives a VUBS error signal from one of the VBUS control units via the USB hub 110, determination processing that refers to the tables in FIG. 7A and FIG. 7B is performed.

First, the table in FIG. 7A is explained. In columns 701 to 703, information on the status before error notification indicating the connection state of the USB device at Port 1 to Port 3 (here, USB ports 113a to 113c) immediately before the VBUS error signal is output is held. Here, the column 701 shows information indicating whether or not the USB device 114a is connected to the USB port 113a, the column 702 shows information indicating whether or not the USB device 114b is connected to the USB port 113b, and the column 703 shows information indicating whether or not the USB device 114c is connected to the USB port 113c. In the table in FIG. 7A, the case where the USB device is connected is indicated by "in use" and the case where the USB device is not connected by "not in use", but any information may be held as long as it is possible for the information to identify the connection state before the VBUS error signal is reported. Those pieces of information on the status before error notification are saved in the storage area, such as the RAM 103, without delay at the time of establishment of connection. In a column 704, information on the source of error transmission, which indicates from which VBUS control unit the VBUS error signal is transmitted, is held. In a column 705, determination results in accordance with each condition (here, Condition 1 to Condition 21) consisting of a combination of the statuses before error notification stored in the columns 701 to 703 and the source of error transmission stored in the column 704 are held. In the present embodiment, letters A to E of the alphabet that identify a plurality of determination results are stored in advance in the column 705 and another table in which the contents of A to E shown below are described is prepared as FIG. 7B.

Figure 8A:
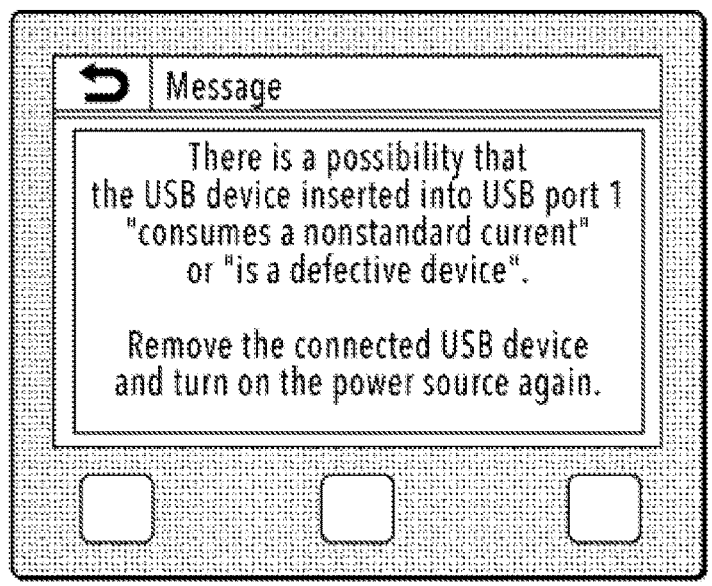
FIG. 8A to FIG. 8C are each a diagram showing an example of an error message.

A: USB device connected to Port 1 consumes a nonstandard current or is defective B: USB device connected to Port 2 consumes a nonstandard current or is defective C: USB device connected to Port 3 consumes a nonstandard current or is defective D: USB device connected to Port 1 consumes a nonstandard current E: Abnormality beyond expectation Condition 1 is a case where the VBUS error signal is received from the first VBUS control unit 201 in a situation in which all the statuses before error notification are "not in use". In a case where an overcurrent has occurred on the USB downstream power line connected to Port 2 (USB port 113b) and Port 3 (USB port 113c), the power supply should be shut off first in the second VBUS control units 202a and 202b whose set threshold value for an overcurrent is low. Consequently, in this case, an overcurrent has occurred on the USB middle stream power line connected to Port 1 (=USB port 113a) and is detected in the first VBUS control unit 201. Consequently, the determination result in this case is "A". FIG. 8A shows an example of an error message that is displayed on the operation unit 109 in a case where the determination result is "A". By the error message such as this, it is possible for a user to grasp the occurrence of abnormality at the USB port and the contents thereof.

Condition 2 is a case where the VBUS error signal is received from the second VBUS control unit 202a in a situation in which all the statuses before error notification are "not in use". In this case, an overcurrent has occurred on the USB downstream power line connected to Port 2 (=USB port 113b) and is detected in the second VBUS control unit 202a. Consequently, the determination result in this case is "B". At this time, on the operation unit 109, an error message that is the error message in FIG. 8A with "Port 1" being replaced with "Port 2" is displayed.

Condition 3 is a case where the VBUS error signal is received from the second VBUS control unit 202b in a situation in which all the statuses before error notification are "not in use". In this case, an overcurrent has occurred on the USB downstream power line connected to Port 3 (=USB port 113c) and is detected in the second VBUS control unit 202b. Consequently, the determination result in this case is "C". At this time, on the operation unit 109, an error message that is the error message in FIG. 8A with "Port 1" being replaced with "Port 3" is displayed.

Figure 8B:
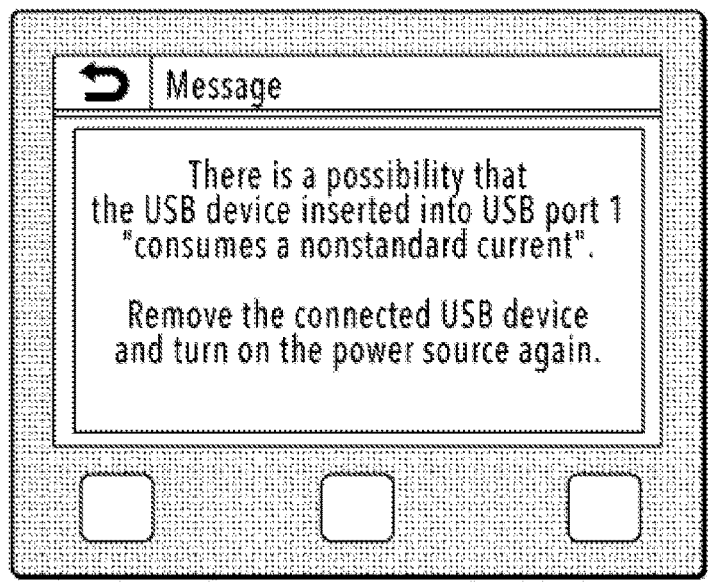

Condition 4 is a case where the VBUS error signal is received from the first VBUS control unit 201 in a situation in which the status before error notification is "in use" for Port 1 and "not in use" for Port 2 and Port 3. In this case, in a situation in which a USB device is connected normally to Port 1 (USB port 113), an error is reported from the first VBUS control unit 201. In a case where a USB device is already connected to Port 1, the port to which a USB device is connected next is Port 2 or Port 3. The currents supplied for Port 2 and Port 3 are limited by the second VBUS control units 202a and 202b, respectively. The output of the VBUS error signal from the first VBUS control unit 201 in this situation means that the total of the consumed current of the USB device 114a and the consumed current of the USB device 114b or the USB device 114c has exceeded the threshold value of the overcurrent in the first VBUS control unit 201. In such a case, it is supposed that the USB device 114a already connected and used has consumed a current exceeding 1,000 mA in the case of the present embodiment in which the set threshold value for overcurrent detection in the first VBUS control unit 201 is taken to be 1,500 mA. Consequently, the determination result in this case is "D". FIG. 8B shows an example of an error message that is displayed on the operation unit 109 in a case where the determination result is "D".

Condition 5 is a case where the VBUS error signal is received from the second VBUS control unit 202b in a situation in which the status before error notification is "in use" for Port 1 and "not in use" for Port 2 and Port 3. In this case, the determination result is "B". Condition 6 is a case where the VBUS error signal is received from the second VBUS control unit 202b in a situation in which the status before error notification is "in use" for Port 1 and "not in use" for Port 2 and Port 3. The determination result in this case is "C". Condition 7 is a case where the VBUS error signal is received from the first VBUS control unit 201 in a situation in which the status before error notification is "in use" for Port 2 and "not in use" for Port 1 and Port 3. The determination result in this case is "A".

Figure 8C:
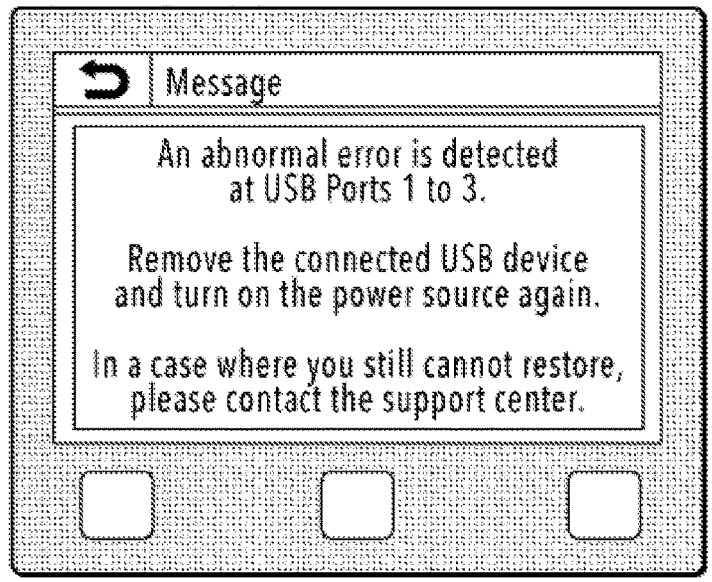

Condition 8 is a case where the VBUS error signal is received from the second VBUS control unit 202a in a situation in which the status before error notification is "in use" for Port 2 and "not in use" for Port 1 and Port 3. This case is a phenomenon that cannot occur in the normal state, in which the VBUS error signal is output from the second VBUS control unit 202a despite the situation in which the USB device 114b is connected to Port 2 normally. Consequently, the determination result in this case is "E". FIG. 8C shows an example of an error message that is displayed on the operation unit 109 in a case where the determination result is "E".

Each of remaining Condition 9 to Condition 21 corresponds to one of the determination results A to E described previously. In the configuration of the present embodiment also, in which a USB port capable of using a specific peripheral device is created, it is possible to detect abnormality of a USB device and to notify a user of the contents thereof as described above.

In the present embodiment, explanation is given by the configuration in which one interface port of the USB host possessed by the SOC is increased up to three ports by using the USB hub, but the configuration is not limited to this. For example, the configuration may be one in which the SOC internally having the USB hub function directly has three interface ports of the USB host. Further, in the present embodiment, the case is explained as an example where there are a total of three USB ports, but the total number of ports may be smaller than or larger than three. Furthermore, in the present embodiment, explanation is given by taking the image forming apparatus as an example, but it is possible to widely apply the present embodiment to an electronic apparatus having an interface of a USB host. Still furthermore, the external interface is not limited to USB (Universal Serial Bus) and another communication standard may be accepted.

As described above, according to the present embodiment, it is possible to enable the use of a peripheral device that consumes a current exceeding the rated current at each port in a simpler system configuration in an electronic apparatus having a plurality of external interfaces.

Second Embodiment

In the first embodiment, the aspect is explained in which it is made possible to use a peripheral device at one port, which consumes a current exceeding the rated current at each port, in an electronic apparatus including a plurality of USB interface ports. Next, an aspect is explained as a second embodiment in which it is made possible to use a peripheral device that consumes a current exceeding the rated current at a plurality of ports. Explanation of the contents in common to those of the first embodiment is omitted or simplified and in the following, different points are explained mainly.

Figure 9:
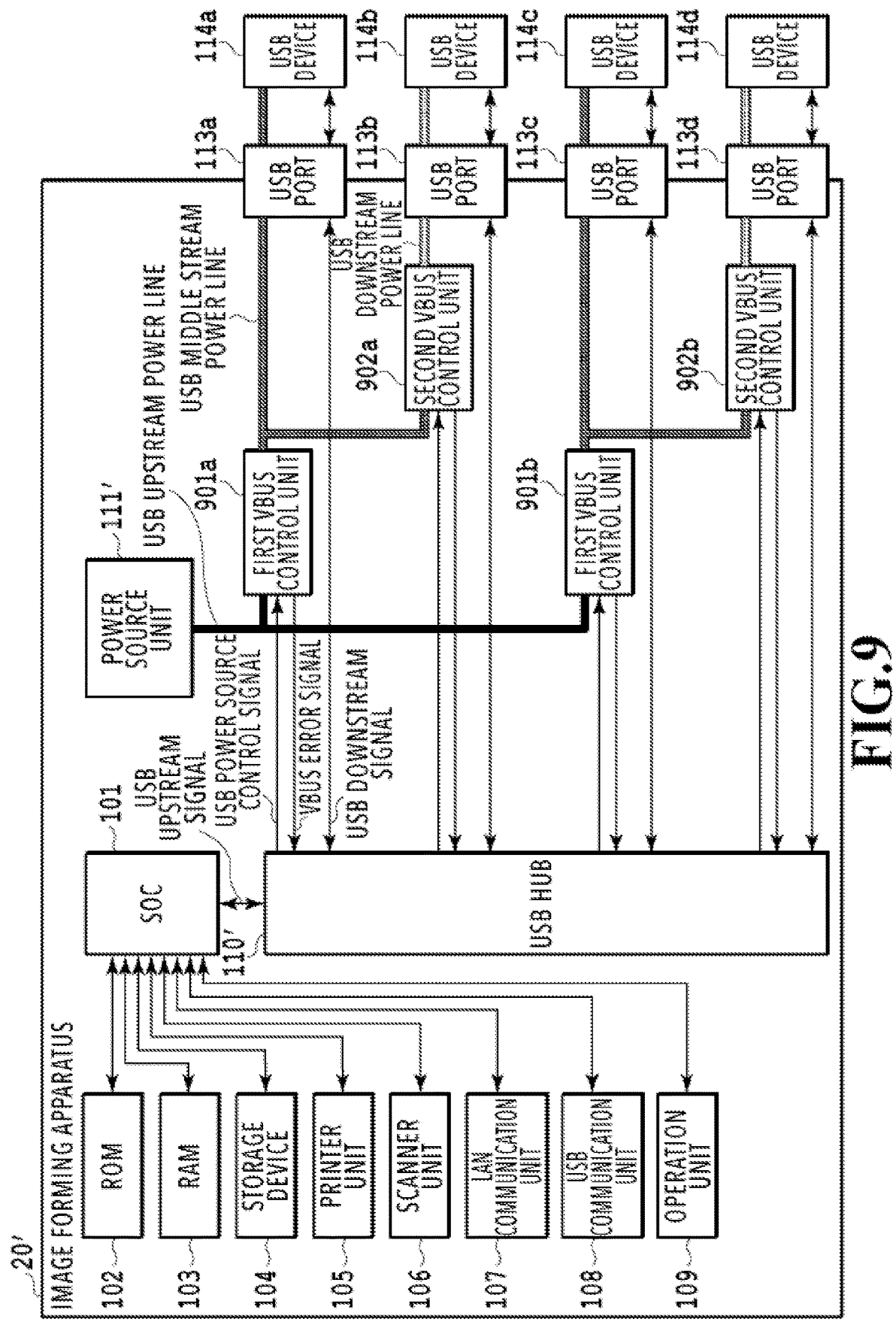
FIG. 9 is a block diagram showing an example of a hardware configuration of an image forming apparatus including a plurality of USB ports according to a second embodiment.

FIG. 9 is a block diagram showing an example of a hardware configuration of an image forming apparatus 20' including a plurality of USB ports according to the present embodiment. The image forming apparatus 20' shown in FIG. 9 differs greatly from the first embodiment in including four USB ports and two first VBUS control units. In the following, the configuration is explained by focusing attention on the points different from the first embodiment.

It is assumed that the rated current at each port is 500 mA, as in the first embodiment, and a power source unit 111' has a supply capacity of 2,000 mA, which can support a total of four USB ports 113a to 113d. Then, a USB hub 110' increases one interface port of a USB host up to four ports, transmits a control signal from the SOC 101 to each of the USB ports 113a to 113d, transmits a notification signal from each VBUS control unit to the SOC 101, and so on. First VBUS control units 901a and 901b correspond to the first VBUS control unit 201 of the first embodiment and second VBUS control units 902a and 902b correspond to the second VBUS control unit 202b of the first embodiment. The feature of the configuration of the present embodiment lies in that the power supplied from the power source control unit 111' is divided into a plurality of systems (here, two systems) and a plurality of ports (here, two) at which a specific peripheral device can be used is created. As described above, it is possible for the power source unit 111' of the present embodiment to supply 2,000 mA at the maximum. By halving 2,000 mA, it is made possible to supply the rated current (=1,000 mA) corresponding to two ports for one branch. Consequently, a threshold value capable of detecting a current exceeding 1,000 mA as an overcurrent is set in the first VBUS control units 901a and 901b, respectively. Then, a threshold value capable of detecting a current exceeding 500 mA as an overcurrent is set in the second VBUS control units 902a and 902b, respectively, connected to the USB middle stream power lines, which are the outputs of the first VBUS control units 901a and 901b. By the configuration such as this, as in the first embodiment, it is possible to set a current that can be used at each USB port to 500 mA.

Next, control for making it possible to use a specific peripheral device at a specific USB port in the configuration of the present embodiment described above is explained along the flowchart in FIG. 4 described previously.

Figure 10A:
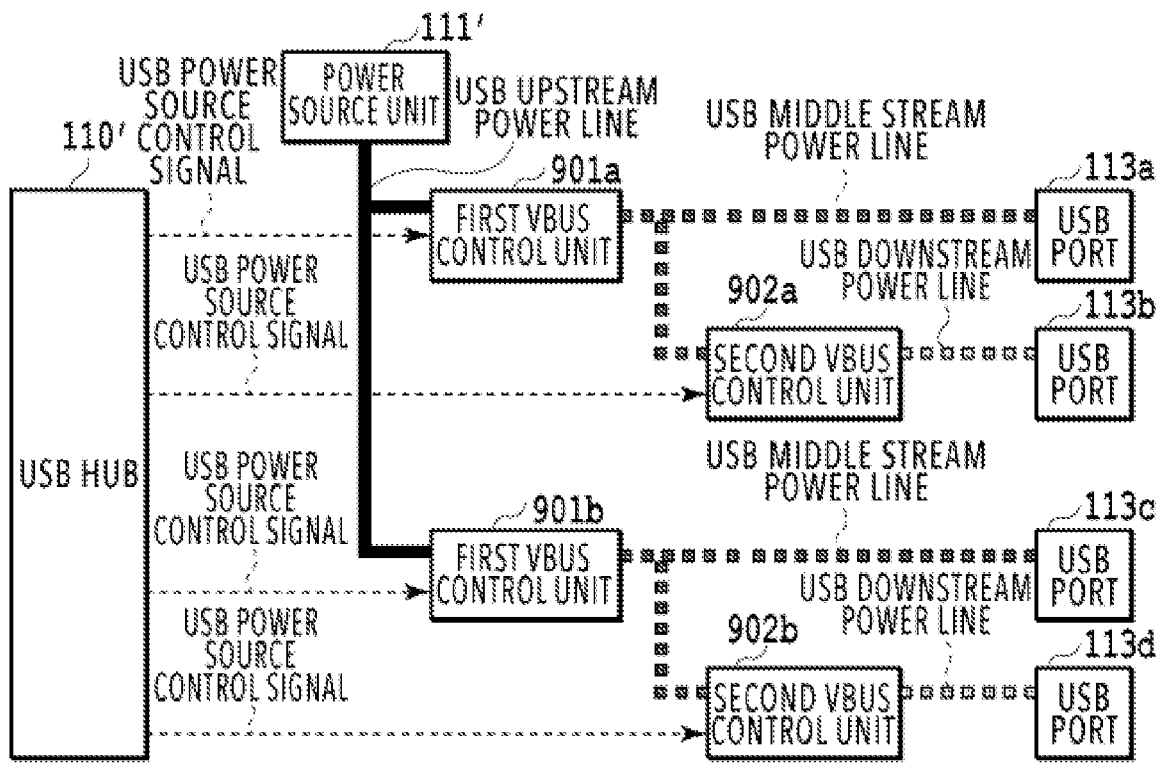
FIG. 10A and FIG. 10B are each a diagram showing an energized state of each power line toward each USB port according to the second embodiment.
Figure 11A:
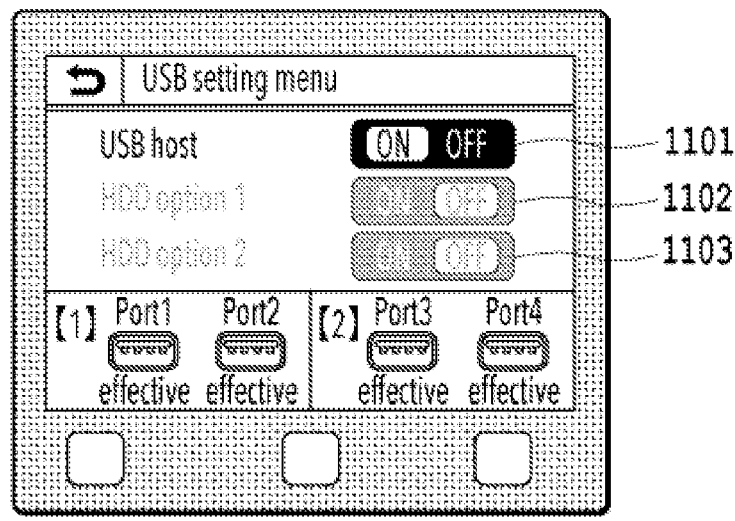
FIG. 11A and FIG. 11B are each a diagram showing an example of a UI screen for USB setting according to the second embodiment.

First, in response to the main power source of the image forming apparatus 20' turning on, the power supply for USB interface is started from the power source unit 111' (step 401). FIG. 10A shows the energized state of each power line toward the USB port 113a to 113d at this time. As in FIG. 5A of the first embodiment, the state in FIG. 10A is a state where only the USB upstream power line is energized and the USB middle stream power line and the USB downstream power line are not energized. An example of a US screen for USB setting, which is displayed on the operation unit 109 at this time, is shown in FIG. 11A. This UI screen differs from the UI screen in FIG. 6A of the first embodiment in that there exist two systems, that is, a first system that supports Port 1 and Port 2 and a second system that supports Port 3 and Port 4, and there are two "HDD option" menus indicating a port at which a specific peripheral device can be used.

Next, whether a setting button 1101 of a "USB host" menu for making it possible to use the USB ports 113a to 113d is set to ON by a user operation is determined (step 402). In a case of ON (Yes at step 402), the power supply for all the USB ports 113a to 113d is started (step 403). Then, whether a predetermined USB port that is made ineffective in a case where the option menu that makes it possible to use a specific peripheral device is made effective is currently in use is determined (step 404). Here, the USB port 113b belonging to the first system and the USB port 113d belonging to the second system are the USB ports to be made ineffective. In a case where these USB ports to be made ineffective are not in use (No at step 404), the display of the option menus on the UI screen in FIG. 11A is changed so that a user can make a selection (step 405).

Figure 10B:
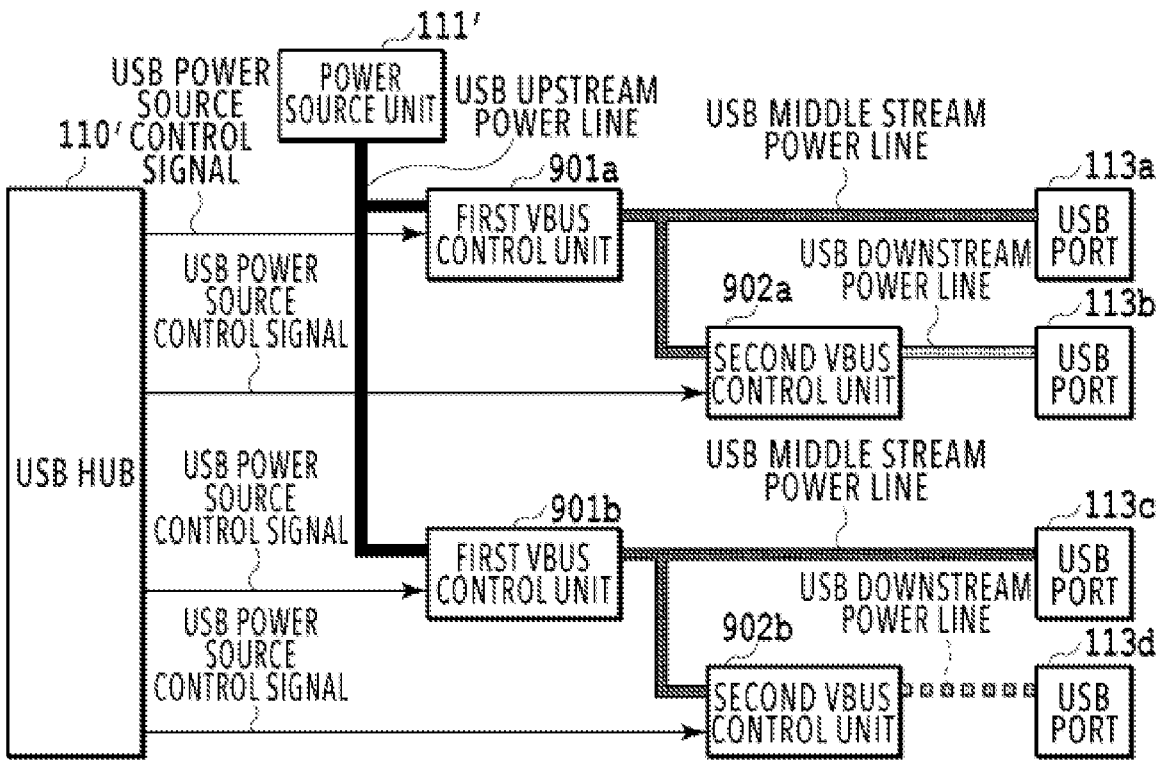
Figure 11B:
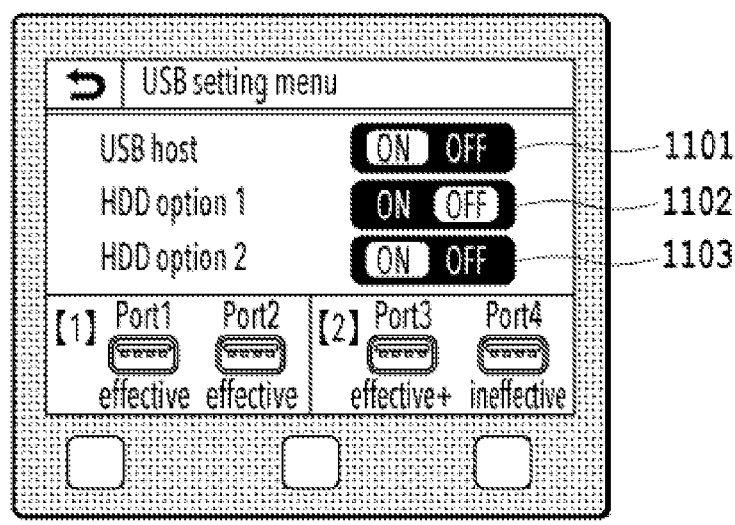

Then, in a case where at least one of the option menus is selected (Yes at step 406), the power supply for another USB port belonging to the same system as the specific USB port relating to the selection is suspended (step 407). For example, it is assumed that a setting button 1103 of HDD option 2 is set to ON. In this case, in order to make it possible to use a peripheral device that operates on a current larger than or equal to the rated current at the USB port 113c corresponding to Port 3, the power supply for the USB port 113d corresponding to Port 4 is suspended. FIG. 10B shows the energized state of each power line toward the USB ports 113a to 113d at this time and the USB downstream power line toward the USB port 113d is changed to the broken line indicating the non-energized state. Due to this, 500 mA that is guaranteed by the second VBUS control unit 902b is saved. Then, by the first VBUS control unit 901b configured to detect a current exceeding 1,000 mA as an overcurrent, the USB port 113c becomes a port at which a current up to 1,000 mA can be used. At the same time, the UI screen changes to that in FIG. 11B and the state display of Port 3 changes from "effective" to "effective +", as well as the state display of Port 4 changes from "effective" to "ineffective".

The above is the contents of the control for making it possible to use a specific peripheral device at a plurality of ports, which consumes a current exceeding the rated current at each port, in an electronic apparatus including a plurality of USB interface ports. In the present embodiment, the example is explained in which it is made possible to use a specific peripheral device at two ports by dividing a total of four ports into two systems and giving a current saved by making ineffective one port in each system to the other port, but the example is not limited to this. For example, it may also be possible to divide the power supplied from the power source unit into three or more systems in an electronic apparatus including more ports. At this time, it may also be possible to set the number of ports belonging to each system to three or more by combining the contents of the preset embodiment with those of the first embodiment.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to enable the use a peripheral device that consumes a current exceeding the rated current at each port in a simpler system configuration in an electronic apparatus having a plurality of external interfaces.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-009581, filed Jan. 24, 2018 which is hereby incorporated by reference wherein in its entirety.

What is claimed is:

1. An electronic apparatus comprising a first interface and a second interface, the electronic apparatus comprising:
   a power supply unit configured to supply power to an external device connected to the first interface and an external device connected to the second interface;
   a first power switching circuit configured to output power supplied from the power supply unit, and cut off power supplied from the power supply unit based on a first set value; and
   a second power switching circuit configured to output power supplied from the first power switching circuit, and cut off the power supplied from the first power switching circuit based on a second set value smaller that the first set value,
   wherein the power supplied by the power supply unit is supplied to the external device connected to the interface via the first power switching circuit, and the power supplied from the power supply unit is supplied to the external device connected to the second interface via the first power switching circuit and the second power switching circuit.

2. The electronic apparatus according to claim 1, wherein, each of the first and second power switching circuits has a detection unit configured to detect a current exceeding a predetermined value on a line used for current supply as an overcurrent,
   the predetermined value detected as an overcurrent by the detection unit of the first power switching circuit is set based on a value that guarantees the total current, and
   the predetermined value detected as an overcurrent by the detection unit of the second switching circuit is set based on a value that guarantees a rated current.

3. The electronic apparatus according to claim 2, wherein each of the first and second power switching circuits has a setting unit configured to set a threshold value corresponding to the predetermined value.

4. The electronic apparatus according to claim 3, wherein the threshold value is determined by a resistance value of a fixed resistor connected to the detection unit.

5. The electronic apparatus according to claim 1, further comprising:
   an external interface control unit configured to instruct the first and second power switching circuits to start and suspend current supply; and
   a user interface for a user to perform setting to increase a rated current for the first interface, wherein
   in a case where setting to increase a rated current for the first interface is performed via the user interface:
   the external interface control unit outputs a signal instructing the second power switching circuit to suspend current supply; and
   the second power switching circuit suspends current supply for the second interface.

6. The electronic apparatus according to claim 5, wherein in a case where the external device is connected to the second interface, it is not possible to perform setting to increase a rated current for the first interface at the user interface.

7. The electronic apparatus according to claim 1, wherein in a case of a plurality of second power switching circuits, the number of second power switching circuits configured to suspend current supply for second interfaces is determined in accordance with a target current value to which a current is to be increased at the first interface.

8. The electronic apparatus according to claim 1, wherein
a line used for current supply from the power supply unit toward the first power switching circuit is divided into a plurality of systems, and
the first power switching circuit is provided in a number corresponding to the number of systems.

9. The electronic apparatus according to claim 2, further comprising:
a determination unit configured to, in a case where the detection unit detects the overcurrent, determine to which interface an external device that has caused the overcurrent is connected by referring to information indicating a connection situation of the external device.

10. The electronic apparatus according to claim 1, wherein
the first and second interfaces are a USB (Universal Serial Bus) standard external interface.

11. The electronic apparatus according to claim 5, wherein
the first and second interfaces are a USB (Universal Serial Bus) standard external interface, and
the external interface control unit is a USB (Universal Serial Bus) standard HUB device.

12. A control method of an electronic apparatus comprising a first interface and a second interface, the electronic apparatus comprising:
a power supply unit configured to supply power to an external device connected to the first interface, and an external device connected to the second interface;
a first power switching circuit configured to output power supplied from the power supply unit, and cut off the power supplied from the power supply unit based on a first set value; and
a second power switching circuit configured to output power supplied from the first power switching circuit, and cut off power supplied from the first power switching circuit based on a second set value smaller than the first set value,
the control method comprising:
supplying the power from the power supply unit to the external device connected to the first interface via the first power switching circuit; and
supplying the power from the power supply unit to the external device connected to the second interface via the first power switching circuit and the second power switching circuit.

* * * * *